Feb. 6, 1962　　　E. J. HIRVONEN　　　3,019,674
BORING BAR CONSTRUCTION
Filed Sept. 18, 1959　　　　　　　　　　4 Sheets-Sheet 1

ERIC J. HIRVONEN
INVENTOR.

BY Charles R. Fay

ATTORNEY

ERIC J. HIRVONEN
INVENTOR.

BY Charles R. Fay

ATTORNEY

Feb. 6, 1962  E. J. HIRVONEN  3,019,674
BORING BAR CONSTRUCTION
Filed Sept. 18, 1959  4 Sheets-Sheet 3

ERIC J. HIRVONEN
INVENTOR.

BY Charles R. Fay

ATTORNEY

Feb. 6, 1962 E. J. HIRVONEN 3,019,674
BORING BAR CONSTRUCTION
Filed Sept. 18, 1959 4 Sheets-Sheet 4

ERIC J. HIRVONEN
INVENTOR.

BY *Charles R. Fay*

ATTORNEY

United States Patent Office 3,019,674
Patented Feb. 6, 1962

3,019,674
BORING BAR CONSTRUCTION
Eric J. Hirvonen, Worcester, Mass., assignor to Leland-Gifford Company, Worcester, Mass., a corporation of Massachusetts
Filed Sept. 18, 1959, Ser. No. 841,435
3 Claims. (Cl. 77—58)

This case is a continuation-in-part of prior application Serial No. 662,106 filed May 28, 1957 now abandoned.

This invention relates to boring bars and especially to mechanism for adjusting the radial position of the tool particularly for compensating for wear thereof to retain accurate depth of cut and for removal and replacement of the tool and the boring bar.

Boring bar adjustments for the same purposes have taken different forms in the prior art, and in order to perform the adjustment, it has been suggested heretofore to use an eccentric sleeve in which the tool is mounted so that upon rotation of the sleeve, the bar and its tool are moved radially to compensate for wear; however, in the prior art it has always been a difficult matter to loosen and tighten the eccentric sleeve to make the adjustment and to remove the tool and substitute a different tool for different cuts, and although this has been accomplished, it has required the use of a set of annularly arranged bolts or screws, all of which must be released in order to loosen the sleeve, and these fastenings must be re-tightened very carefully and evenly in order to approximate the original setting of the tool relative to the wall of the hole being bored.

Specifically, it is an object of the present invention to provide a very simplified and easily operated but accurate construction both for removal and replacement of the bar and for adjustment of the tool radially; and it is a further specific object of the invention to provide means for this purpose which is accessible at a point adjacent the tool and the work, rather than the prior art construction at the rear or driven end of the spindle. By so placing the adjustment device adjacent the tool itself instead of at the rear of the tool head, a great improvement in convenience and speed of change is made because in many instances in the prior art it is practically impossible to make such an adjustment due to the complexity of the machine involved and due to the multiplicity of boring bar tools assembled in many machines.

A further object of the invention resides in the provision of a boring bar including a cylindrical spindle with an axial recess at one end of the spindle, said recess being concentric relative to the spindle, and receiving therein an eccentric split sleeve, the boring tool being received in said sleeve and being clamped therein upon contraction of the split sleeve thereabout, together with means for moving said sleeve in order to contract and release the same, and means for rotating the sleeve relative to the spindle to adjust the radial position of the bar and tool, said sleeve and said means being located adjacent the tool itself and being quickly and easily accessible in the machine in which the same is used, i.e., at the front of the head rather than at the rear thereof, and including means for providing an equal pressure at all points circumferentially of the bar, so that an original position is easily achieved after replacement of the tool or adjustment thereof.

Other objects and advantages of the invention will appear hereinafter.

Reference is to be had to the accompanying drawings, in which

Figure 1:
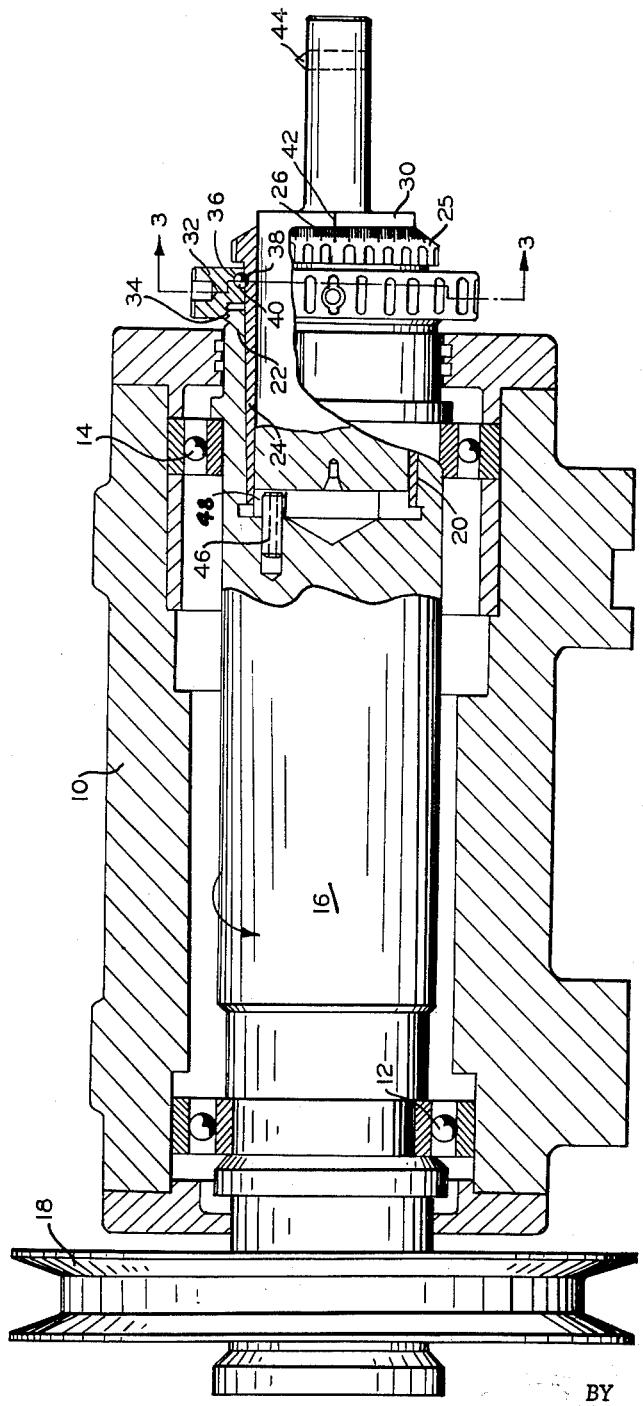
FIG. 1 is a longitudinal sectional view showing the invention.

In carrying out the present invention, there is provided in general a tool head 10 which provides bearings 12 and 14 for a spindle generally indicated at 16. This spindle may be driven by a pulley 18 on an extending end thereof.

The spindle 16 is provided at its forward or working end with a central tapered inwardly-extending open end recess 20 having inwardly convergent walls; and it has a slightly forwardly-extending end at 22 which is externally screw-threaded. An externally tapered split sleeve conforming to the recess 20 is generally indicated at 24, and is inserted in the recess. The larger end of sleeve 24 extends outwardly from the recess and from the head and is provided with a knurled or indented turning collar or the like 25 having an annular scale and a zero mark at 26. It is to be particularly noted that recess 20 is concentric relative to the spindle 16.

Figure 3:
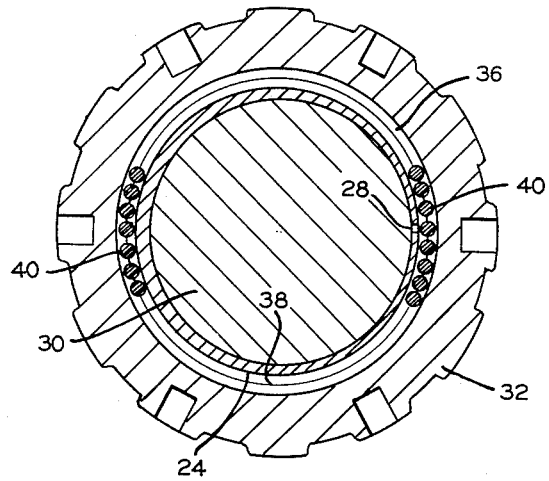
FIG. 3 is a section on line 3—3 of FIG. 2.
Figure 4:
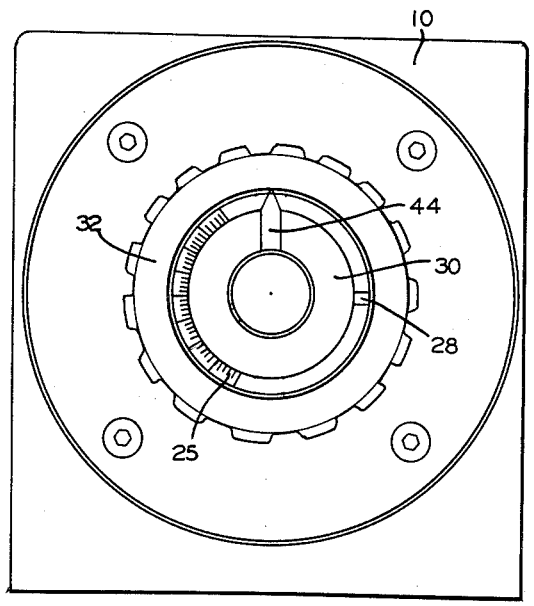
FIG. 4 is a view in elevation, looking in the direction of arrow 4 in FIG. 2.

The sleeve 24 is eccentric and as stated it is tapered externally but it is cylindrical internally. The split in this sleeve is indicated at 28 in FIG. 3, and the eccentricity of this sleeve is exaggerated somewhat in this figure in order to properly illustrate the same. The eccentricity ordinarily provides an adjustment of .005 of an inch or thereabouts as will be hereinafter described.

Figure 2:
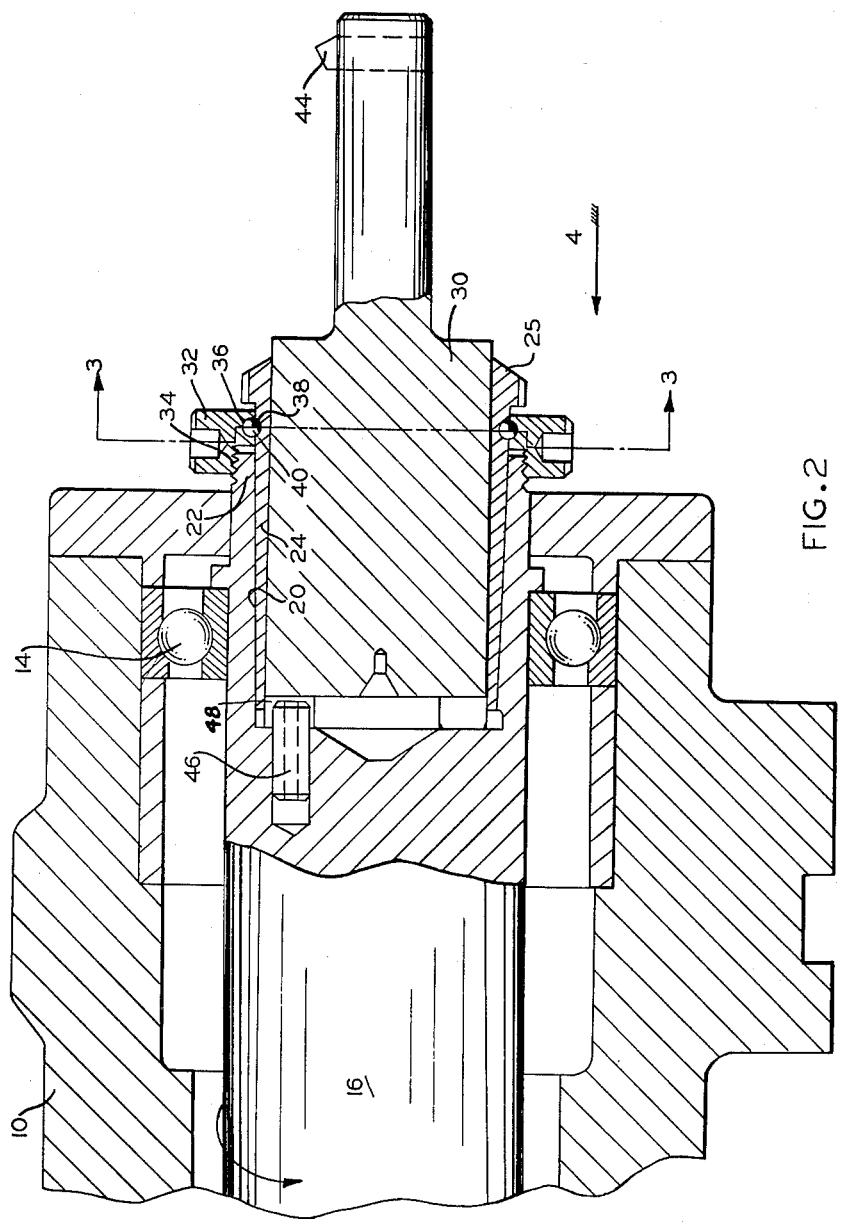
FIG. 2 is a sectional view on a larger scale.

A cylindrical tool body indicated at 30 is provided in the sleeve 24 and this is adapted to be grasped and tightly held by the sleeve when the same is retracted by being moved to the left in its tapered recess in FIG. 2. The tool body may be released from the sleeve by moving the latter to the right, and in this case the tool may be replaced by a different tool body and again clamped.

In order to move the sleeve as above described, there is provided an operating ring or the like generally indicated at 32. This ring is provided with an annular recess at one side face thereof and this recess is provided with internal screw-threads indicated at 34. These screw-threads engage with those on the extending end 22 of the spindle 16. Therefore, as ring 32 is rotated, it moves right or left in FIGS. 1 and 2, depending upon the direction of rotation.

The operating ring 32 relatively closely engages the exterior surface of the split sleeve 24 and in this area it is provided with an internal annular recess or groove as at 36. The split sleeve is provided with a complementary annular recess or groove 38 and the two grooves 36 and 38 together present an annular race-way having a circular cross section.

In this annual race-way, there are provided a plurality of spherical balls 40 which substantially fill the same, and these balls serve to connect ring 32 to sleeve 24, so that the latter is moved right and left in FIG. 2 with the motion of the ring. The ring may be provided with holes to receive a spanner or it may be rotated in any way desired.

The tool body 30 is provided with a zero mark 42 and the rest of this tool is more or less conventional including a cutter member 44.

With the parts as shown in FIG. 2, the tool is clamped in position with zero marks 26 and 42 coinciding to give the correct desired depth of cut while the spindle is rotating. However, the cutter 44 gradually wears and it is therefore desired to move the same radially outwardly to compensate for the wear. In order to do this, it is merely necessary to turn ring 32 in a direction to move the sleeve 24 to the right in FIG. 2. This direction of rotation will be counter-clockwise in FIG. 3. Because of the connection occasioned by balls 40, rotation of ring 32 moves the sleeve in the desired direction, so that the sleeve is loosened and may be turned in its bore 20 by the adjacent turning collar 25 so as to move the tool body 30 and the cutter 44 slightly radially, due to the eccentricity of the sleeve with respect to the axis of the spindle 16. When the desired adjustment is reached, the ring 32 is rotated in the opposite direction and the split sleeve 24 again clamps the tool in operating condition.

In the same way, the tool may be removed and replaced by a different tool, that is, merely by loosening ring 32 and thereby loosening sleeve 24, the tool becomes unclamped and may be slipped out and a new tool replaced. Upon reclamping the sleeve by means of the ring 32, the new tool is clamped in position and it is a simple matter to align zero points 26 and 42 so as to result in the correct positioning of the cutter member on the desired depth of cut.

The tool is rotated by the spindle by means of a pin or the like 46 which is eccentrically mounted in the spindle at the bottom of the bore 20 and extends into a cross slot or the like 48 at the rear end of the tool 30 as clearly shown in FIG. 2.

It will be seen that the split eccentric sleeve, ring 32, and turning collar 25 all cooperate to provide a quick, easy, accurate clamp and adjustment, and the re-clamping is done evenly all about the sleeve 24 so that accuracy is maintained at each setting.

By means of the concentric recess 20 in combination with the eccentric sleeve 20, any ordinary tool or bar can be held. There are no eccentric parts except sleeve 24 which can easily be changed with sleeves of different exterior eccentricity providing fine or relatively coarse adjustments. Also of course, the concentric surfaces are easier and less expensive to make than the conventional offset recesses, etc. of the prior art. It is to be particularly noted that this construction provides for quicker and easier adjustment and clamping of the tool, and yet there is but a single eccentric surface involved, and that is at the exterior of the sleeve 24. The interior of sleeve 24 is cylindrical.

Figure 5:
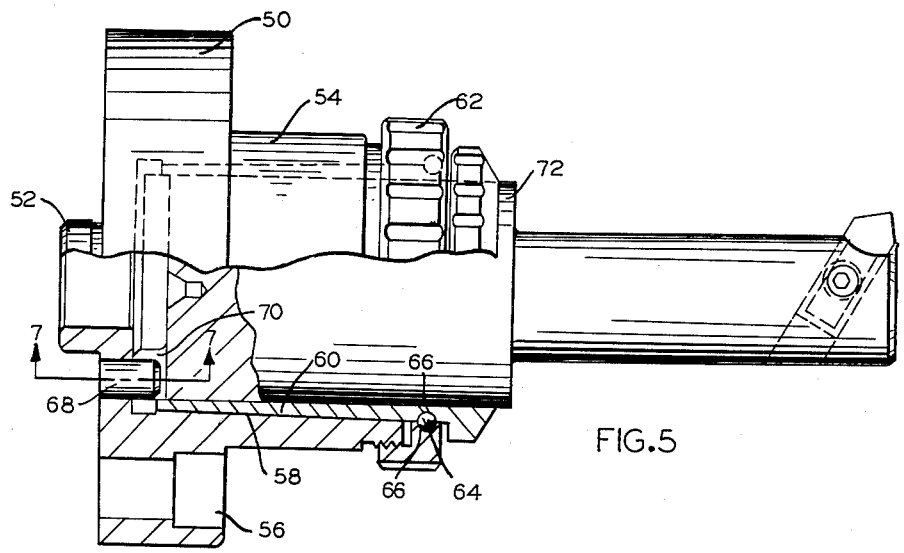
FIG. 5 is an elevational view partly in section of a modification.
Figure 6:
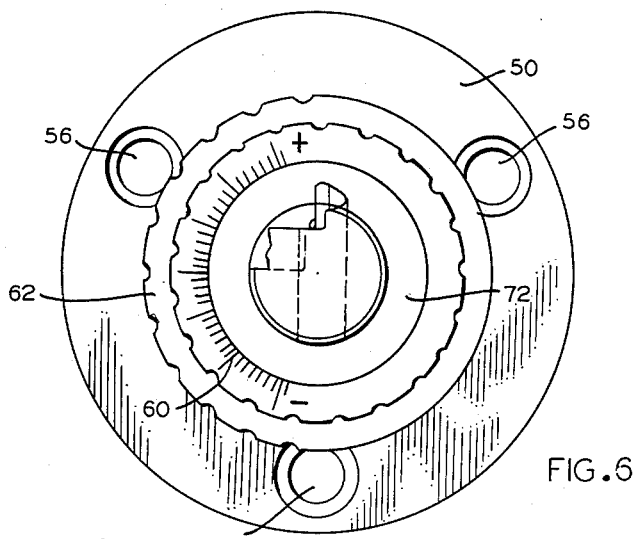
FIG. 6 is an end elevational view thereof.
Figure 7:
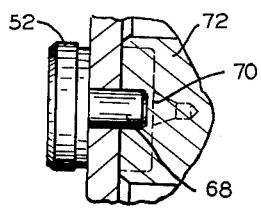
FIG. 7 is an enlargement on line 7—7 of FIG. 5.

A modification is shown in FIGS. 5 and 6 wherein the invention is disclosed as in a form to be applied to the end of a conventional spindle (not shown) rather than being applied to the recess 20 in spindle 16. A flange 50 having a center member 52 to enter the usual pilot hole in the conventional spindle, is provided on an annular member 54 which is comparable to the end of the special spindle 16. In this case however, the flange is provided with holes 56 by the use of which the member 54 is secured to the end of the usual spindle.

The member 54 is provided with a recess 58 similar to that at 20, and in this recess there is removably disposed an eccentric sleeve 60 like that at 24. A nut 62 is threaded on the end of the member 54 and is connected to the sleeve 60 by means such as the balls 64 in the partial grooves at 66, all like the construction above described, and for the same purpose. Also an eccentric pin 68 in a slot 70 drives the bar 72 in the same manner as the pin 46 in the slot 48 without interfering with the action of the adjustment and removal of the bar.

Thus the modified form of the invention is applicable to a conventional spindle and the bar can be adjusted and replaced almost instantly with a simple rotation of the sleeve and effective to cause the sleeve to be moved FIGS. 1 and 2.

Having thus described my invention and the advantages thereof, I do not wish to be limited to the details herein disclosed, otherwise than as set forth in the claims, but what I claim is:

1. A boring bar construction comprising a head, a cylindrical spindle therein, means to drive the spindle, a bore in the spindle at an end thereof, said bore being concentric with the spindle, a tapered sleeve in the bore for the removable reception of a boring tool, said sleeve being eccentric at its outer surface and cylindrical at the inner surface thereof, means connecting the spindle and boring tool to drive the latter by the former, means to tighten and loosen the sleeve by proper axial motion thereof to clamp or release the tool therein, the sleeve being rotatively adjustable to adjust the tool radially and the tool being selectively removable when the sleeve is loose, said sleeve tightening and loosening means including a substantially annular rotatable member engaging the sleeve and effective to cause the sleeve to be moved axially to be tightened evenly and circumferentially thereof in the bore, said annular member being located adjacent the tool.

2. The boring bar construction of claim 1 wherein the sleeve is split and said annular rotatable member is a nut threaded onto the spindle and engaging the split sleeve.

3. The boring bar construction of claim 1 wherein the sleeve is split and said annular rotatable member is a nut threaded onto the spindle and engaging the split sleeve, said sleeve being removable and replaceable by a sleeve having a different degree of eccentricity.

References Cited in the file of this patent
UNITED STATES PATENTS

| 2,609,209 | Perman | Sept. 2, 1952 |

FOREIGN PATENTS

| 252,837 | Switzerland | Nov. 1, 1948 |
| 908,573 | France | Oct. 1, 1945 |